Dec. 29, 1970     C. E. QUISENBERRY     3,551,004
BICYCLE IMPROVEMENT
Filed Nov. 19, 1968
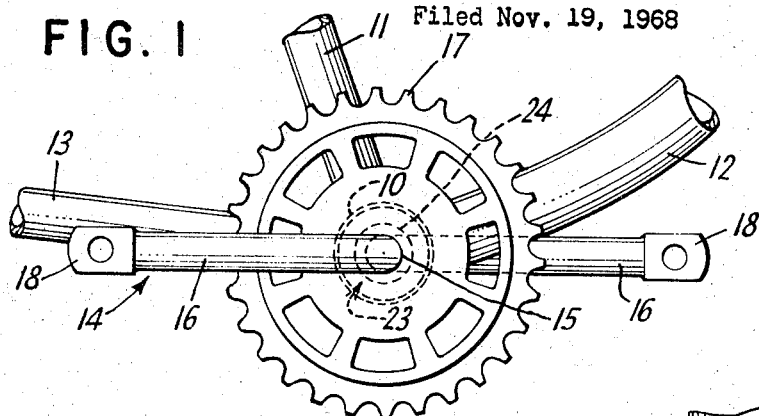
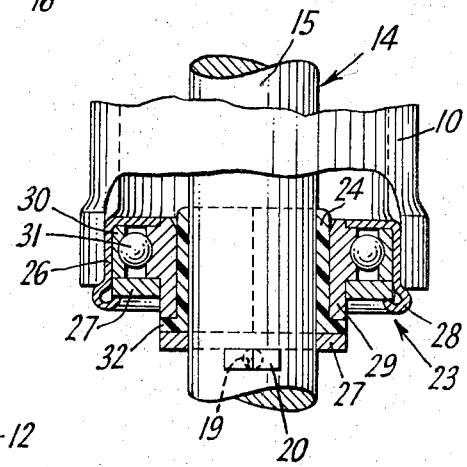
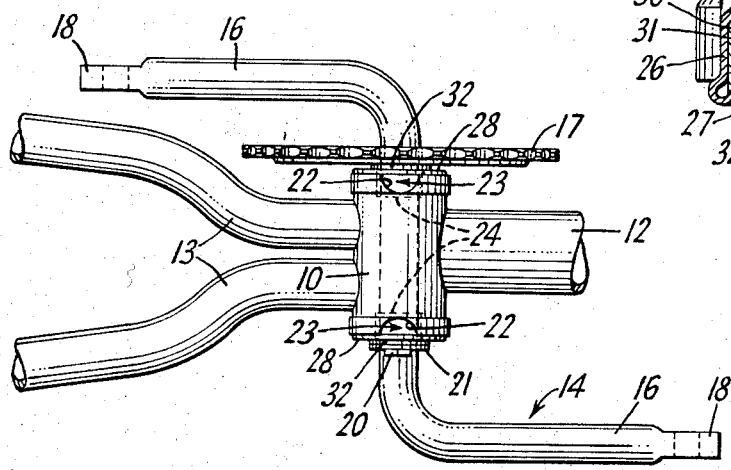
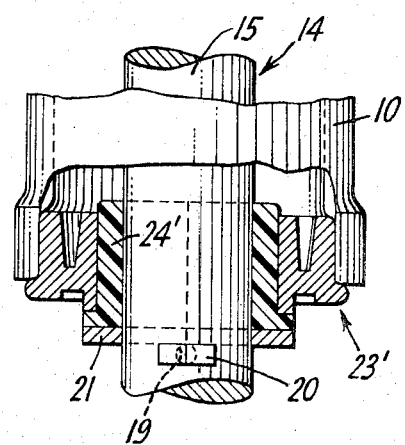
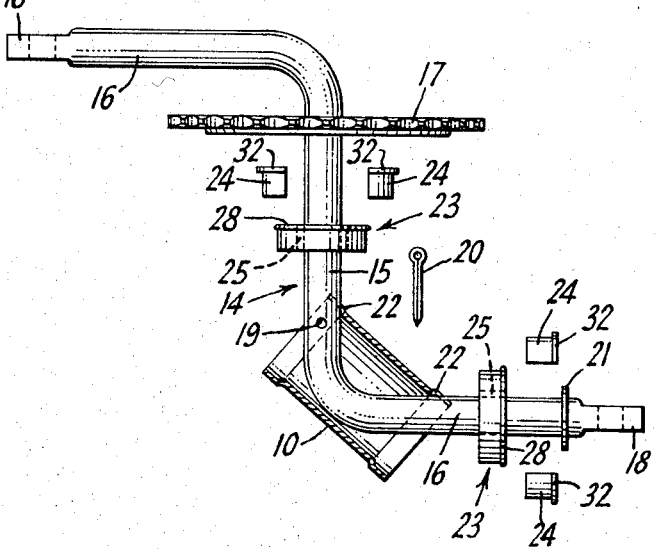
INVENTOR.
CARTER E. QUISENBERRY
BY
*Walter Lewis*
ATTORNEY United States Patent Office 3,551,004
Patented Dec. 29, 1970

3,551,004
BICYCLE IMPROVEMENT
Carter E. Quisenberry, Olney, Ill., assignor to American Machine & Foundry Company, a corporation of New Jersey
Filed Nov. 19, 1968, Ser. No. 777,043
Int. Cl. B62k 19/34
U.S. Cl. 280—281                                    4 Claims

ABSTRACT OF THE DISCLOSURE

The opposite ends of the pedal crank hanger tube are notched to reduce its size while facilitating snaking the pedal crank into the hanger tube.

---

This invention relates to an improvement in bicycles, and more particularly, to an improvement in the construction and mode of assembling bicycles.

It is an object of this invention to provide a low cost construction for the pedal crank-to-hanger tube mounting of bicycles, which mounting requires a minimum number of separate parts and is easy to assemble.

Briefly, in the preferred form of the invention notches are formed at opposite ends of the hanger tube. These notches enable a reduction in the size of the hanger tube while still enabling easy snaking of a generally S-shaped pedal crank into position in the hanger tube. In addition, improved end bearing assemblies are provided for journaling the pedal crank in the hanger tube, said bearing assemblies requiring no lubrication, adjustment, or special care in completing the pedal crank-to-hanger tube assembly.

The features of the invention which are believed to be novel are set forth with particularity in the appended claims. The invention itself, however, both as to its organization and operation, together with further objects and advantages thereof, may best be understood by reference to the following description taken in connection with the accompanying drawings in which:

FIG. 1 is a side elevation view of that portion of a bicycle which my invention is directly concerned with;

FIG. 2 is a bottom plan view of the structure shown in FIG. 1;

FIG. 3 is an exploded view of the parts to illustrate their method of assembly;

FIG. 4 is an enlarged view of the end bearing assembly for the pedal crank; and

FIG. 5 is an enlarged view of an alternate form of end bearing assembly.

Referring now particularly to the drawings, illustrated therein is part of a conventional bicycle frame comprising a pedal crank hanger tube 10 having a seat post 11, a bottom front frame bar 12, and two bottom rear frame bars 13 permanently connected thereto by means such as welding. A pedal crank 14 is shown as being mounted in the hanger tube. The hanger tube 10 is horizontally disposed and the central portion 15 of crank 14 is aligned with the axis of the tube 10. The crank 14 has two arms 16 which are perpendicular to central portion 15 and extend therefrom in opposite directions. Pedal crank 14 is fabricated from solid circular rod stock which is bent into its generally S or Z-shaped form.

A sprocket wheel 17 is fixed to one end of the central portion 15 by means such as welding. It is positioned inboard of one of the crank arms 16 adjacent the corresponding end of the hanger tube 10. The outer ends of the crank arms 16 have apertured and enlarged flattened portions 18 for mounting not shown foot pedals thereon. The crank pedal 14 and its end bearing assemblies, to be described hereinafter, is retained in assembled position in the hanger tube by retaining means on the other end of the central portion 15. This retaining means, which is removable, comprises a cotter pin hole 19 in the central portion 15, a cotter pin 20 in the hole 19, and a washer 21 on the central portion 15 inboard of the cotter pin 19.

The pedal crank 14 is positioned in the hanger tube 10 by snaking it therein in the manner illustrated in FIG. 3. In order to facilitate this while still maintaining a minimum diameter in hanger tube 10, a pair of notches 22 are formed in the opposite end edges of tube 10 on the bottom side of the tube 10. During the manufacturing cycle the bicycle frame is positioned with its bottom facing up. The notches 22 are semi-circular in shape and slightly larger than half of the circular cross section of the rod 14. The end of the pedal crank 14 opposite to the sprocket wheel 17 is first inserted into the tube 10 and then snaked therethrough to its final position wherein the central portion 15 is in the tube 10 and the arms 16 are positioned outside tube 10 along opposite ends thereof. Since the notches 22 are slightly oversize with respect to rod 14 it will readily ride along the notches 22 during the operation of snaking the pedal crank 14 through the hanger tube 10. It will be appreciated that if notches 22 were not present the tube 10 would have to have a larger size to snake the pedal crank 14 in position. Therefore, the notches 22 make it possible to reduce the diameter of tube 10 for a given size pedal crank 14.

The end bearing assemblies between opposite ends of the central portion 15 and opposite ends of the tube 10 will now be described. Each comprises a unitary annular bearing 23, which is self contained and has no loose parts, and a plastic bearing sleeve diametrically split into two pieces 24. The inside of bearings 23 is slightly larger than the circular portion of rod 14 so as to pass the flattened end portions 18. That is to say, there is an annular space 25 between the inner circumference of bearings 23 and the outer surface of rod 15. The outer portion of bearings 23 has a snug fit in the opposite ends of the tube 10 adjacent the notches 22. The split sleeves 24 are inserted into the spaces 25 and have a snug fit on the rod 14 and in the bearings 23.

In assembly of the pedal crank and its end bearings into the hanger tube 10 the following procedure is followed. First one bearing 23 is placed on rod 14 and moved to along central portion 15 near the sprocket wheel 17. Then a split sleeve 24 is inserted between that bearing 23 and the central portion 15, and that assembled end bearing is then moved against the sprocket wheel 17. Then the pedal crank 14 is snaked into the tube 10 until the end of tube 10 adjacent to the sprocket wheel 17 passes on to the bearing 23 adjacent the sprocket wheel 17. Thereafter the other bearing 23 is passed on the rod 14 and moved therealong until it enters the end of the tube 10 which is near the cotter pin hole 19. Then the other split sleeve 24 is inserted into the space between the rod 14 and the bearing 23 near the cotter pin hole 19. Thereafter the washer 21 is placed on the rod 14 and moved therealong to near the hole 19 and then cotter pin 20 is inserted in hole 19 behind washer 21. Thus, the pedal crank 14 and its end bearings are held captive in their assembled position within hanger tube by being trapped between the immovable sprockets wheel 17 and the washer 21 and its cotter pin 20. Of course, should one desire to disassemble the parts, this is readily accomplished merely by removing the cotter pin 20 and following the reverse procedure of that described above. Due to the use of the unitary bearings 23 and their sleeves 24 no special steps are required in journaling the opposite ends of the central portion 15 in the opposite ends of the hanger tube. The unitary bearings 23 are prelubricated and closed so there are no loose or falling parts and no bearing adjustment or calibration is required to complete the assembly since all the necessary components readily fit into place in and of themselves.

The details of the end bearings 23, 24 are illustrated in FIG. 4. The bearing 23 comprises a cup 26, and end closure 27 which is engaged by a lip 28 on cup 26, an inner race 29, an outer race 30, and bearing balls 31 between the races 29 and 30. The cups 26 have a snug fit in the ends of tube 10, and their movement into the tube 10 is limited by engagement between the lips 28 and the end edges of the tube 10. The inner race 29 is spaced from the rod 15 by the two complementary semicircular sleeve portions 24. The outer ends of sleeves 24 have lips 32 which butt against the outer ends of inner races 29 to limit inward movement of the sleeves 24. The sleeves have a snug fit about the rod 15 and within the inner race 29 so that when rod 15 turns so do sleeve 24 and inner race 29. Inner race 29 of course runs on the balls 31. If it is desired to disassemble the parts the cottor pin 20 is removed and the sleeves 24 can be removed from within the inner races 29 by inserting a knife blade or the like between the lips 32 and the adjacent end edges of the inner races 29. The bearings 23 are similarly removed from within the ends of tube 10. That is, by inserting a knife blade between the lips 28 and the adjacent end edges of tube 10 these parts can also be pried apart.

A modification of the end bearings is shown in FIG. 5. The arrangement in FIG. 5 is the same as that shown in FIG. 4 except that a low cost single piece bearing 23' is used in place of the ball bearing 23, and sleeve 24 is replaced by a split sleeve 24' which has self lubricating characteristics. The split sleeve 24 preferably are constructed from a durable plastic such as nylon, and the split sleeves 24' may be given a self lubricating quality by constructing them from graphite impregnated plastic, such bearing sleeve being readily available on the market place.

In view of the foregoing it will now be seen that my invention provides an improved, low cost, and simplified pedal crank-to-hanger tube construction over that afforded by the prior art. Also, my construction makes it possible to reduce costs in the factory since the process of assembling the bicycle is simplified over that required by prior art constructions.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed is:

1. In a bicycle comprising a frame having a horizontally disposed pedal crank receiving hanger tube and a pedal crank mounted therein, said pedal crank comprising a single piece integrally formed member having a central portion which is adapted to be aligned with the axis of said tube and an integral crank arm formed at each end thereof which is adapted to be positioned outside said tube, said crank arms being disposed in perpendicular relationship to said central portion and extending therefrom in opposite directions, means for reducing the diameter of said tube while facilitating snaking said pedal crank through said tube to mount it therein, said means comprising a notch formed at each of the opposite end edges of said tube, said notches being disposed on the same side of said tube, said pedal crank comprising a solid circular rod, said notches having a semi-circular shape, said notches being slightly larger than said rod whereby said rod loosely rides along said notches as said rod is snaked through said tube, wherein opposite ends of said central portion are journaled in opposite ends of said tube by a pair of bearing assemblies, each bearing assembly comprising a circular bearing, the outer circumferential portion of each bearing having a snug fit in the end portion of said tube where said notches are formed, the inner circumferential portion of each bearing being separated from said rod by an annular space therebetween, and a pair of bearing sleeves in each of said spaces having a snug fit with said rod and the inner circumferential portions of said bearings, each of said sleeves being diametrically split into two semi-circular complementary portions.

2. In a bicycle as in claim 1, the outer ends of said crank arms having enlarged flattened portions formed thereon which are adapted to have foot pedals connected thereto, said enlarged portions being larger than said rod, the inner circumferential portions of said bearing being large enough to pass said flattened portions therethrough.

3. In a bicycle as in claim 2, each of said bearings comprising a self-contained unit having no loose parts, a sprocket wheel mounted on one end of said central portion between one of said crak arms and one end of said hanger tube, the other end of said central portion having means thereon for retaining said pedal crank and its bearing assemblies positioned in said hanger tube in assembled relationship.

4. In a bicycle as in claim 3, said retaining means comprising a cotter pin hole formed in said other end of said central portion, a cotter pin positioned in said hole, and a washer on said central portion positioned between said cotter pin and its adjacent bearing assembly, and said hanger tube having a permanent connection to said frame.

References Cited

UNITED STATES PATENTS

| | | | |
|---|---|---|---|
| 634,525 | 10/1899 | Hance | 308—179.5 |
| 2,670,219 | 2/1954 | Shakesby et al. | 74—594.1X |

FOREIGN PATENTS

| | | | |
|---|---|---|---|
| 98,364 | 8/1898 | Germany | 74—594.2 |

KENNETH H. BETTS, Primary Examiner

U.S. Cl. X.R.

74—594.1; 308—179.5